United States Patent
Go et al.

(10) Patent No.: US 10,111,171 B2
(45) Date of Patent: Oct. 23, 2018

(54) METHOD AND APPARATUS FOR HTTP ADAPTIVE STREAMING IN WIRELESS NETWORK ENVIRONMENT

(71) Applicants: Samsung Electronics Co., Ltd., Suwon-si (KR); Seoul National University R&DB Foundation, Seoul (KR)

(72) Inventors: Yun-Min Go, Pohang-si (KR); Hwang-Jun Song, Pohang-si (KR); Oh-Chan Kwon, Pohang-si (KR); Yong-Seok Park, Seoul (KR); Do-Jun Byun, Seoul (KR); Chul-Ho Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 249 days.

(21) Appl. No.: 14/885,677

(22) Filed: Oct. 16, 2015

(65) Prior Publication Data
US 2016/0112953 A1    Apr. 21, 2016

(30) Foreign Application Priority Data

Oct. 16, 2014    (KR) ......................... 10-2014-0139759

(51) Int. Cl.
*H04W 52/02* (2009.01)
*H04L 29/06* (2006.01)
*H04W 80/10* (2009.01)

(52) U.S. Cl.
CPC ....... *H04W 52/0229* (2013.01); *H04L 65/608* (2013.01); *H04W 80/10* (2013.01); *Y02D 70/00* (2018.01); *Y02D 70/1262* (2018.01); *Y02D 70/142* (2018.01); *Y02D 70/21* (2018.01)

(58) Field of Classification Search
None
See application file for complete search history.

(56) References Cited

U.S. PATENT DOCUMENTS

| | | | |
|---|---|---|---|
| 2015/0319214 A1* | 11/2015 | Yu | H04L 65/4069 709/219 |
| 2016/0057489 A1* | 2/2016 | He | H04N 21/4424 725/14 |
| 2016/0234328 A1* | 8/2016 | Yamagishi | H04N 21/238 |

FOREIGN PATENT DOCUMENTS

KR    20110032289    3/2011

OTHER PUBLICATIONS

"Dynamic adaptive streaming over HTTP—Standards and Design principles", in Proceedings of the second annual ACM conference on Multimedia systems, pp. 133-144 (2011).

* cited by examiner

*Primary Examiner* — Adnan Baig
(74) *Attorney, Agent, or Firm* — McAndrews, Held & Malloy, Ltd.

(57) ABSTRACT

The present disclosure relates to a pre-$5^{th}$-Generation (5G) or 5G communication system to be provided for supporting higher data rates Beyond $4^{th}$-Generation (4G) communication system. Disclosed is a method of receiving a video segment from at least one streaming server by a client device using hypertext transfer protocol (HTTP) adaptive streaming in a wireless network. The method includes: acquiring media presentation description (MPD) information by receiving an MPD file from the streaming server and parsing the received MPD file; determining a first parameter to minimize a cost function considering both energy consumption required for receiving a video segment and video quality of the segment based on the MPD information; requesting at least one video segment to the at least one streaming server during a first segment request round based on the first parameter; and receiving the at least one video segment from the at least one streaming server.

20 Claims, 10 Drawing Sheets

METHOD AND APPARATUS FOR HTTP ADAPTIVE STREAMING IN WIRELESS NETWORK ENVIRONMENT

RELATED APPLICATION(S)

This application claims priority under 35 U.S.C. § 119(a) to Korean Application Serial No. 10-2014-0139759, which was filed in the Korean Intellectual Property Office on Oct. 16, 2014, the entire content of which is hereby incorporated by reference.

BACKGROUND

The present disclosure relates to an HTTP adaptive streaming method and apparatus considering energy consumption of a mobile terminal in a heterogeneous wireless network.

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, recent developments include Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology.

An adaptive streaming technology corresponds to a technology, which adaptively selects a proper video quality in consideration of a network environment and an environment of a client terminal; that is, adaptive streaming technologies configured to meet quality desired by a user in time-varying wireless network environment. The adaptive streaming technology is applied based on various network protocols, such as a Real-time Transport Protocol (RTP) or a Real-Time Streaming Protocol (RTSP), and a Hypertext Transfer Protocol (HTTP) adaptive streaming technology using the HTTP is spotlighted at present.

The HTTP adaptive streaming technology may have advantages of improvement of a network compatibility problem of the streaming service. The advantages may arise through the use of the conventional HTTP technology and reuse of the conventional HTTP server for the streaming service. Further, in the HTTP adaptive streaming technology, since a client has a core part of the streaming control, a client-oriented streaming service for may be provided for the client receiving the service.

FIG. 1 illustrates an example of structures of a server and a client that provide Dynamic Adaptive Streaming over HTTP (DASH) contents. A video provided by a server 100 of the DASH is encoded in various levels of quality. For example, one video may be encoded and stored as a video 120 encoded at a low bitrate, a video 130 encoded at a high bitrate, and a video encoded at an intermediate bitrate.

One encoded video 120 may include segments 122, 124, and 126 of a predetermined play time unit. The server 100 of the DASH provides information, such as quality of video, play time of a video and a data amount to the client 110. The information is recorded in a Media Presentation Description (MPD) file 140.

The client 110 makes a request for the MPD 140 to the server 100 for DASH service. When the client 110 receives the MPD 140 from the server 100, the client 110 may know information such as quality of a video stored in the server 100, a play time of the video, and the like. Thereafter, the client 110 may make a request for a segment according to a network state and an environment of a client terminal based on the received MPD. The client 110 makes a request for the segment through an HTTP 150, receives the segment in response to the request, and plays a video.

The client 110 may include a controller 112 that performs an operation of requesting/receiving the MPD and requesting/receiving the segment and a media play unit 114 that receives the received segment and plays media.

DASH technology, however, operates on a single network. Accordingly, when a state of a wireless channel for communication is not good or traffic congestion occurs, a smooth service is not possible even though the adaptive streaming technology is applied.

Thus, new technologies to remove limitations of a single network through the use of a plurality of networks by the client in a heterogeneous wireless network environment have been proposed. When the client simultaneously uses a plurality of networks, the limitation of the single network can be compensated for and also network throughput can be improved. Therefore, the client can receive a higher definition video.

SUMMARY

As a client terminal uses a plurality of networks, energy consumption of the terminal increases compared to a case where the terminal uses only a single network. Further, the increase in the energy consumption of the terminal has a close relation with a provided video quality.

Accordingly, the present disclosure provides an HTTP adaptive streaming method and apparatus for efficient energy consumption of the terminal in an environment in which a plurality of wireless networks are used.

Further, the present disclosure provides a method and an apparatus for using an energy-image quality weighted value in consideration of a correlation between energy consumed by the terminal and the video quality of the provided video when a plurality of wireless networks are simultaneously used.

In addition, the present disclosure provides a method and an apparatus for receiving a streaming service by adaptively controlling video quality while consuming a battery by an amount equal to or smaller than a target battery consumption amount set by the user.

In accordance with an aspect of the present disclosure, a method of receiving a video segment from at least one streaming server by a client device using HTTP adaptive streaming in a wireless network is provided. The method includes: acquiring media presentation description (MPD) information by receiving an MPD file from the streaming server and parsing the received MPD file; determining a first parameter to minimize a cost function considering both energy consumption required for receiving a video segment and video quality of the video segment based on the MPD information; requesting at least one video segment to the at least one streaming server during a first segment request round based on the first parameter; and receiving the at least one video segment from the at least one streaming server.

In accordance with another aspect of the present disclosure, a client device for receiving a video segment from at least one streaming server by using HTTP adaptive streaming in a wireless network is provided. The client device includes: a controller configured to acquire media presentation description (MPD) information by receiving an MPD file from the streaming server and parsing the received MPD file, determine a first parameter to minimize a cost function considering both energy consumption required for receiving a video segment and video quality of the video segment based on the MPD information, and request at least one video segment to the at least one streaming server during a first segment request round based on the first parameter, and receives the at least one video segment from the at least one streaming server; and a media play unit configured to play a video by using the received video segment.

The present disclosure can provide a streaming service considering energy of a terminal when a plurality of networks are used through an HTTP adaptive streaming technology.

The present disclosure can provide a seamless streaming service by selecting an optimal parameter according to an energy-video quality weighted value set by the user to the terminal using the HTTP adaptive streaming technology based on a wireless network environment.

The present disclosure can provide a seamless streaming service while consuming a battery by an amount equal to or smaller than a target battery consumption amount set by the user.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Embodiments of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Accordingly, the terms should be defined based on the contents over the whole present specification.

In the detailed description of the present disclosure, an example of interpretable meanings of some terms used in the present disclosure is proposed. However, it is noted that the terms are not limited to the examples of the construable meanings which are proposed below.

A server may be referred to as a streaming server as a subject over a network that communicates with a client terminal to provide media data such as a video.

A client terminal may be referred to as a terminal, a mobile terminal, a User Equipment (UE) terminal, a Mobile Station (MS), a Mobile Equipment (ME), a device, and the like as a subject that communicates with the server to receive media data, such as a video.

The present disclosure will describe a client terminal that makes a request for a video segment to one or more wireless networks in consideration of a state of a wireless channel (that is, network path) and energy consumption of the terminal and receives the video segment.

Figure 1:
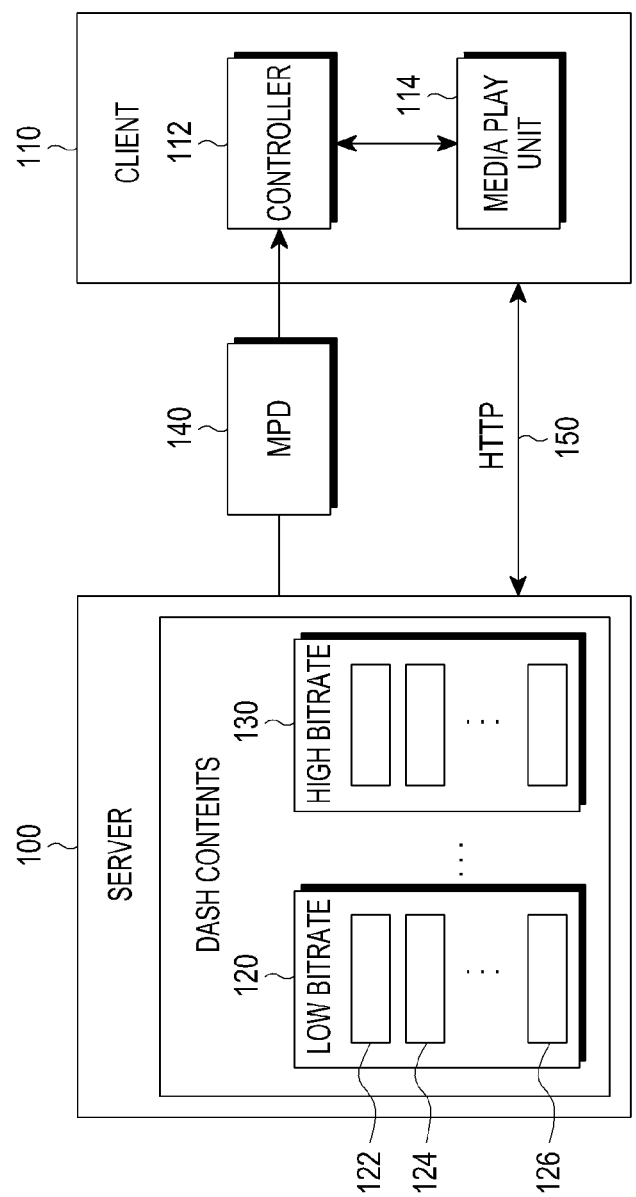
FIG. 1 illustrates an example of structures of a server and a client that provide Dynamic Adaptive Streaming over HTTP (DASH) contents.
Figure 2:
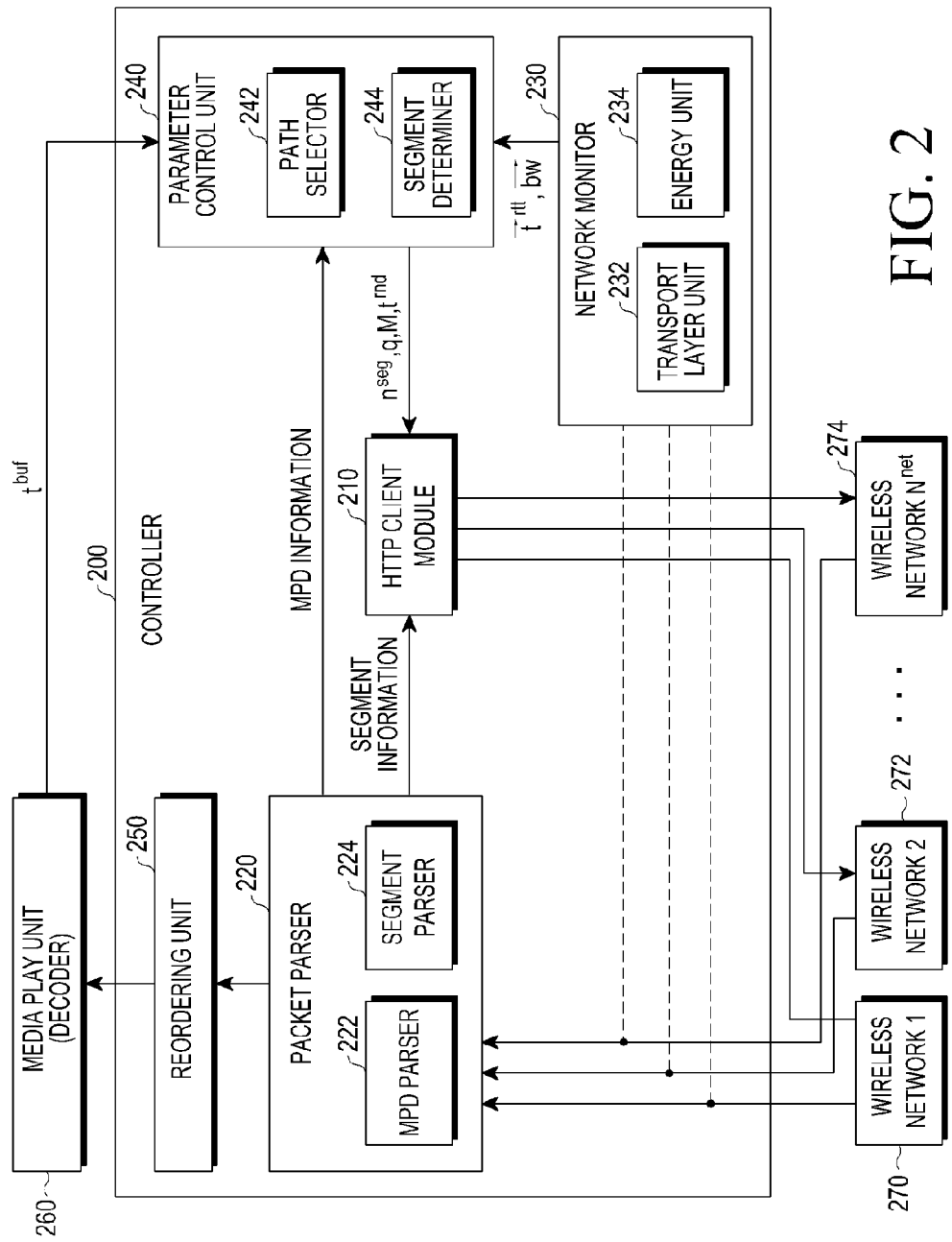
FIG. 2 is a view conceptualizing an operation and a structure of a client terminal according to the present disclosure.

FIG. 2 is a view conceptualizing an operation and a structure of a client terminal according to the present disclosure.

A client terminal apparatus according to the present disclosure may communicate with a streaming server through one or more networks 270, 272, and 274. The client terminal apparatus may include a controller 200 that communicates with the one or more networks 270, 272, and 274 and a media play unit 260 that plays a video segment. The client terminal apparatus may be implemented in the form of a mobile terminal such as, for example, a smart phone and a smart pad.

The controller 200 may include at least one of five main modules, that is, an HTTP client module 210, a packet parser 220, a network monitor 230, a parameter control unit 240, and a reordering unit 250. The controller 200 may be analyzed as a subject that performs all operations of the terminal described below.

The HTTP client module 210 may make a request for a Media Presentation Description (MPD) file, which corresponds to video metadata file, to the streaming server based on the HTTP. Further, the HTTP client module 210 may receive information from the parameter control unit 240 and the packet parser 220 and make a request for a video segment to the streaming server based on the information.

The packet parser 220 may parse the MPD file received from the server, acquire MPD information or segment information from the MPD file, and provide the acquired MPD information to the HTTP client module 210 or provide the segment information to the parameter control unit 240. Further, the packet parser 220 may receive segment data from the streaming server, identify the received segment data (that is, video segment), and transmit the segment data to the reordering unit 250. The packet parser 220 may include at least one of an MPD parser 222 that parses the MPD file and a segment parser 224 that parses segment data. The packet parser 220 may further include a Transmission Control Protocol (TCP) reception buffer used for data reception.

The network monitor 230 may monitor a state (for example, a network bandwidth and a delay state) of a network which can be used by the client terminal and predict a future state based on the monitored information. Further, the network monitor 230 may monitor and manage energy information (for example, an amount of consumption) according to the use of the wireless network by the client terminal. The network monitor 230 may include at least one of a transport layer unit 232 for monitoring a network and an energy unit 234 for monitoring consumed energy.

The parameter control unit 240 may determine a parameter to be used for adaptive streaming based on information (for example, MPD information, network bandwidth bw, and a round trip time $t^{rtt}$ according to each path during a segment request round (indicating a delay state)) received from the network monitor 230 or the packet parser 220. The parameter determined by the parameter control unit 240 may include at least one of the number $n^{seg}$ of segments requested for one segment request round, a time $t^{rnd}$ of the segment request round, video quality q, and packet distribution matrix M information according to each network. The parameter control unit 240 may include at least one of a path selector 242 that determines a path according to each network, that is, a packet distribution matrix according to each network, and a segment determiner 244 that determines the number of segments, a segment request round time, and video quality.

The reordering unit 250 may sequentially combine video segment data received from a plurality of wireless networks and transmit the sequentially combined segment data to an application buffer of the media play unit 260.

The media play unit 260 may serve to play media (for example, videos) by using segment data (for example, video segment data). The media play unit 260 may include a decoder and an application buffer.

Figure 3:
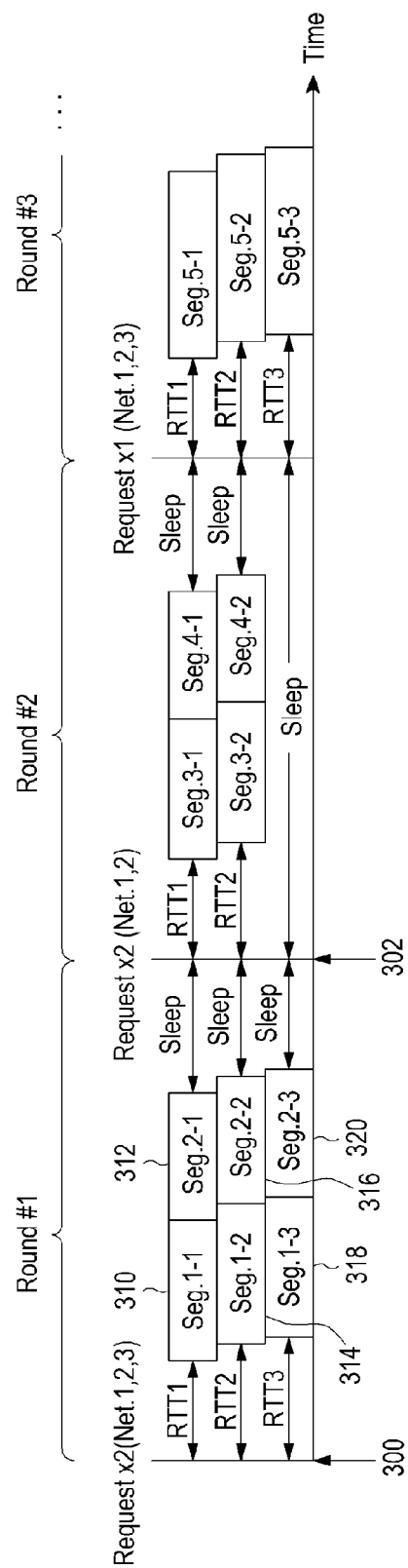
FIG. 3 illustrates an example of segment request round(s) according to the present disclosure.

FIG. 3 illustrates an example of segment request round(s) according to the present disclosure.

In adaptive streaming according to the present disclosure, one video may be divided in predetermined time units, and the videos divided in the time units correspond to segments. Further, there are a plurality of segments for a particular unit time according to video quality. That is, the video may be divided into segments of different video qualities.

According to the present disclosure, an interval from a time point 300 when the client makes a request for a segment to the server to a time point 302 when the client makes a request for a next segment to the server is called a segment request round. An operation of the client according to the present disclosure may be performed in the unit of segment request rounds.

As illustrated in FIG. 3, one segment request round may be divided into three intervals such as a request duration, a download duration, and a sleep duration. At a start point 300 of the request duration (RTT 1, RTT 2, and RTT 3), the client makes a request for a segment to the server.

After the Round Trip Time (RTT) passes from the time point 300 when the client makes a request for the segment, the client starts receiving the requested segment. An interval in which the client receives (that is, downloads) the segment is referred to as the download duration 310, 312, 314, 316, 318, and 320.

An interval in which the network is not used from a time point when the download of the segment ends to a time point when the segment request round ends is referred to as the sleep duration.

During the segment request round, for example, four control parameters may be needed. The four control parameters may be determined when each segment request round starts. The four control parameters correspond to the number $n^{seg}$ of segments, video quality q of the segment, a segment scheduling map M, and the segment request round $t^{rnd}$.

The client according to the present disclosure makes a request for a same quality video (that is, one video) during one segment request round. This is to provide video quality as stable as possible to the user.

The client may receive one segment partitively through a plurality of networks in parallel during one segment request round. Due to the parallel reception of one segment, the client may acquire an effect of using a combined bandwidth of a plurality of wireless network bandwidth and make a request for a video of higher quality compared to a case where a single network is used. In addition, an out-of-order arrival problem of the data which may occur when the client makes a request for one segment to the single network may be reduced and, accordingly, seamless video play is possible.

In adaptive streaming, the client may change video quality according to data throughput of the client. The client according to the present disclosure may calculate throughput computed according to the time through an exponential weighted moving average shown in equation (1) and predict a bandwidth available according to each wireless path.

$$bw_i(t)=\alpha \cdot r_i(t)+(1-\alpha)\cdot bw_i(t-1) \qquad (1)$$

In equation (1), $r_i(t)$ denotes throughput predicted for an $i^{th}$ network at time t, $bw_i(t)$ denotes an exponential weighted moving average of the throughput for the $i^{th}$ network at time t, and $\alpha$ denotes a weighted value of the exponential weighted moving average and has a value from 0 to 1.

Main parameters used in the present disclosure are shown in Table 1.

TABLE 1

| Parameter | Description |
| --- | --- |
| $N^{net}$ | Number of network interfaces which can be used by the client terminal |
| $N^{qlt}$ | Number of video quality levels which can be provided by the server |
| $n^{seg}$ | Number of segments requested for one segment request round |
| q | Segment video quality level |
| $v_q$ | Video bitrate (unit: kbps) of the segment when the segment video quality level is q |
| $t^{rnd}$ | Segment request round time (unit: second) |
| M | Segment scheduling map |

TABLE 1-continued

| Parameter | Description |
| --- | --- |
| $\vec{t}^{rtt} = (t_1^{rtt}, t_2^{rtt}, \ldots, t_{N^{est}}^{rtt})$ | Round Trip Time (RTT) according to each path during segment request round |
| $\vec{bw} = (bw_1, bw_2, \ldots, bw_{N^{est}})$ | Bandwidth according to each path during segment request round |

The segment request scheduling map M refers to a matrix including the number of packets requested according to each path for one segment request round and may be expressed as follows.

$$M = \begin{bmatrix} m_{1,1} & m_{1,2} & \cdots & m_{1,n^{seg}} \\ m_{2,1} & m_{2,2} & \cdots & m_{2,n^{seg}} \\ \vdots & \vdots & \ddots & \vdots \\ m_{N^{nat},1} & m_{N^{nat},2} & \cdots & m_{N^{nat},n^{seg}} \end{bmatrix} \quad (2)$$

In the above matrix, $m_{i,j}$ denotes an amount of data of a $j^{th}$ segment (the number of packets) requested from the $i^{th}$ network.

The number of packets included in the $j^{th}$ segment may be expressed as follows.

$$\sum_{i=1}^{N^{nat}} m_{i,j} = \left\lceil \frac{S_{j,q}}{P^{size}} \right\rceil \quad (3)$$

In equation (3), $S_{j,q}$ denotes the size of bytes of the $j^{th}$ segment when a video quality level is q, and $P^{size}$ denotes the size of a packet payload.

At this time, a download time $t_i^{down}(M)$ of data downloaded through the $i^{th}$ network is as follows.

$$t_i^{down}(M) = \frac{P^{size} \cdot \sum_{j=1}^{n^{seg}} m_{i,j}}{bw_i} \quad (4)$$

Figure 4:
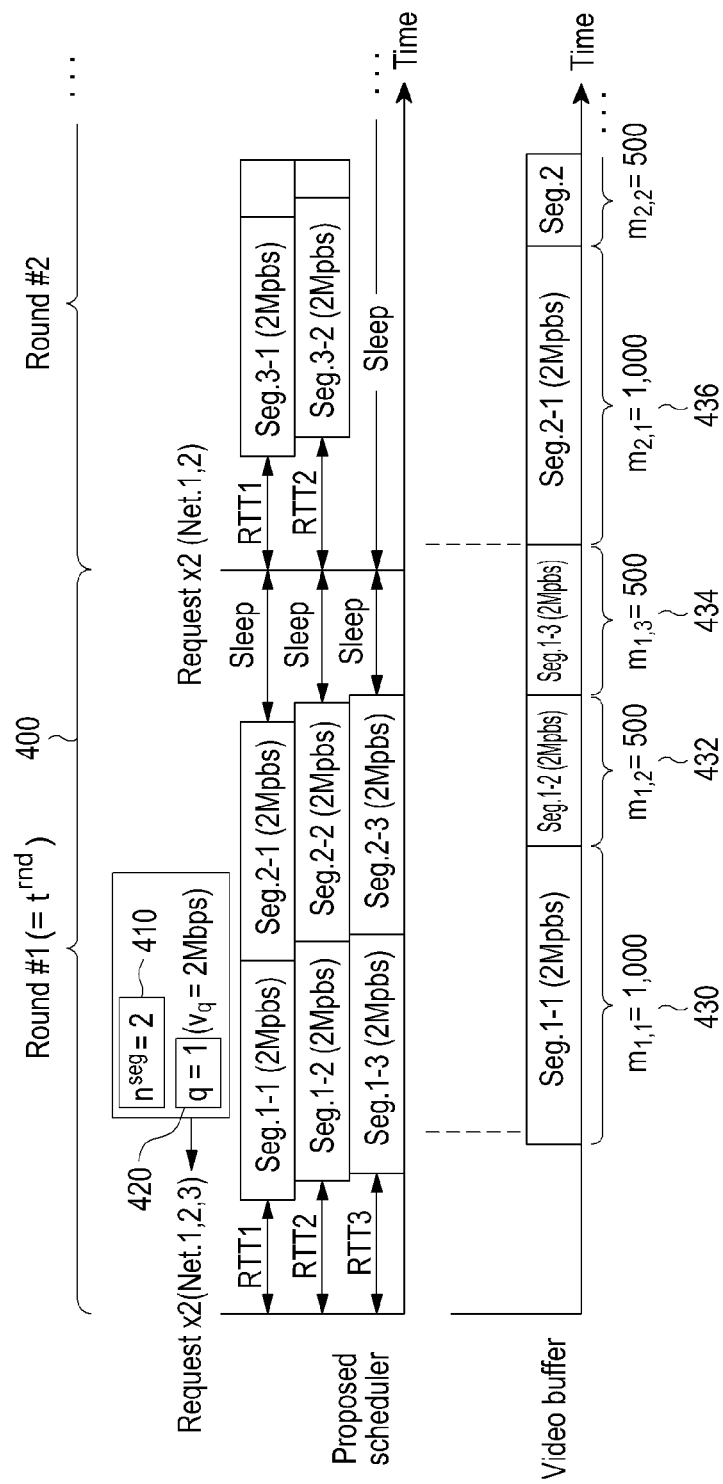
FIG. 4 illustrates an example of parameters used by the terminal in the segment request round according to the present disclosure.

FIG. 4 illustrates an example of parameters used by the terminal in the segment request round according to the present disclosure.

In a first segment request round (Round #1) of FIG. 4, the terminal makes a request for two segments to three wireless networks. At this time, a length 400 of the first segment request round is expressed by a parameter $t^{rnd}$. The number of segments requested by the terminal is expressed by a parameter $n^{seg}$ 410. In the first segment request round, the video quality requested by the terminal is expressed by q 420. The scheduling map M, which is a result of the scheduling by the terminal, may be expressed by parameters indicating the number of packets $m_{1,1}$ 430, $m_{1,2}$ 432, $m_{1,3}$ 434, and $m_{2,1}$ 436.

As illustrated in FIG. 4, the length $t^{rnd}$ of the segment request round, the number $n^{seg}$ of requested segments, the video quality level of q the requested segment, and the segment request scheduling map M, corresponding to the parameters used in the present disclosure influence energy consumed by the client terminal, thereby having an effect on the user viewing a seamless high definition video.

Hereinafter, an HTTP adaptive streaming scheme in which the client according to the present disclosure simultaneously considers energy and video quality in a heterogeneous wireless network environment and an efficient parameter determination scheme for the same will be described.

That is, the efficient parameter determination to be described in the present disclosure may correspond to a matter for determining the length $t^{rnd}$ of the segment request round that minimizes a cost function $\Omega(q, n^{seg}, M, t^{rnd})$, the number of requested segments $n^{seg}$, the video quality level q of the requested segment, and the segment request scheduling map M according to each path. The cost function $\Omega(q, n^{seg}, M, t^{rnd})$ may be defined as equation (5).

$$\lambda \cdot \frac{e(n^{seg}, M, t^{rnd})}{E^{seg}} + (1 - \lambda) \cdot \frac{d(v_q)}{D^{max}} \quad (5)$$

Equation (5) corresponds to a cost function calculated by normalizing each of energy consumption $$\frac{e(n^{seg}, M, t^{rnd})}{E^{seg}}$$

and video quality $$\frac{d(v_q)}{D^{max}},$$

and may give a weighted value to a preferred element by using an energy-video quality weighted value λ (lambda). λ has a value from 0 to 1. In equation (5), $d(v_q)$ denotes an average distortion value for the requested segment quality and $D^{max}$ denotes a maximum average distortion value for all segment qualities which can be provided by the server.

At this time, equation (5) has constraints such as equations (6) to (9) below.

$$n^{seg} \geq 1 \quad (6)$$

$$\sum_{j=1}^{n^{seg}} s_{j,q} \leq S^{buf} \quad (7)$$

$$e(n^{seg}, M, t^{rnd}) \leq E^{seg} \quad (8)$$

$$\max_{1 \leq i \leq N^{net}} \{t_i^{rtt} + t_i^{down}(M)\} \leq \chi \cdot t^{rnd} \quad (9)$$

Equation (6) shows that the number of segments requested by the client terminal is larger than or equal to 1.

In equation (7), $s_{j,q}$ denotes the size of the $j^{th}$ segment of the video quality q. $S^{buf}$ denotes the buffer size of the client terminal, and corresponds to a sum of the size of a TCP reception buffer and the size of an application buffer of the media play unit. Equation (7) corresponds to a condition to not increase an amount of energy consumption by making the size of segment data not larger than the buffer size of the terminal.

In equation (8), $e(n^{seg}, M, t^{rnd})$ denotes average energy consumed per segment by the parameter for the segment request round, and $E^{seg}$ denotes maximum energy consumed for one segment play time $T^{seg}$. That is, equation (8)

corresponds to a condition to make the average energy consumption per segment request round not exceed a limited maximum value.

Equation (9) corresponds to a constraint to maintain a period of the segment request round longer than or equal to a predetermined size in order to not generate underflow (phenomenon corresponding to disconnection of a video since there is no data in the buffer) in the receiving side buffer (that is, buffer of the client terminal, and $\chi$ (chi) is a reference value from 0 to 1 to prevent buffer underflow.

Subsequently, a method of calculating an amount of energy consumption for the segment request round to solve the parameter determination problem will be described.

In order to determine the parameter, it is required to predict the amount of energy consumption of the client terminal according to the parameter. The present disclosure considers energy consumption at the client terminal side generated by the use of the wireless network and considers a simplified energy consumption pattern as illustrated in FIG. 5 to solve the problem.

Figure 5:
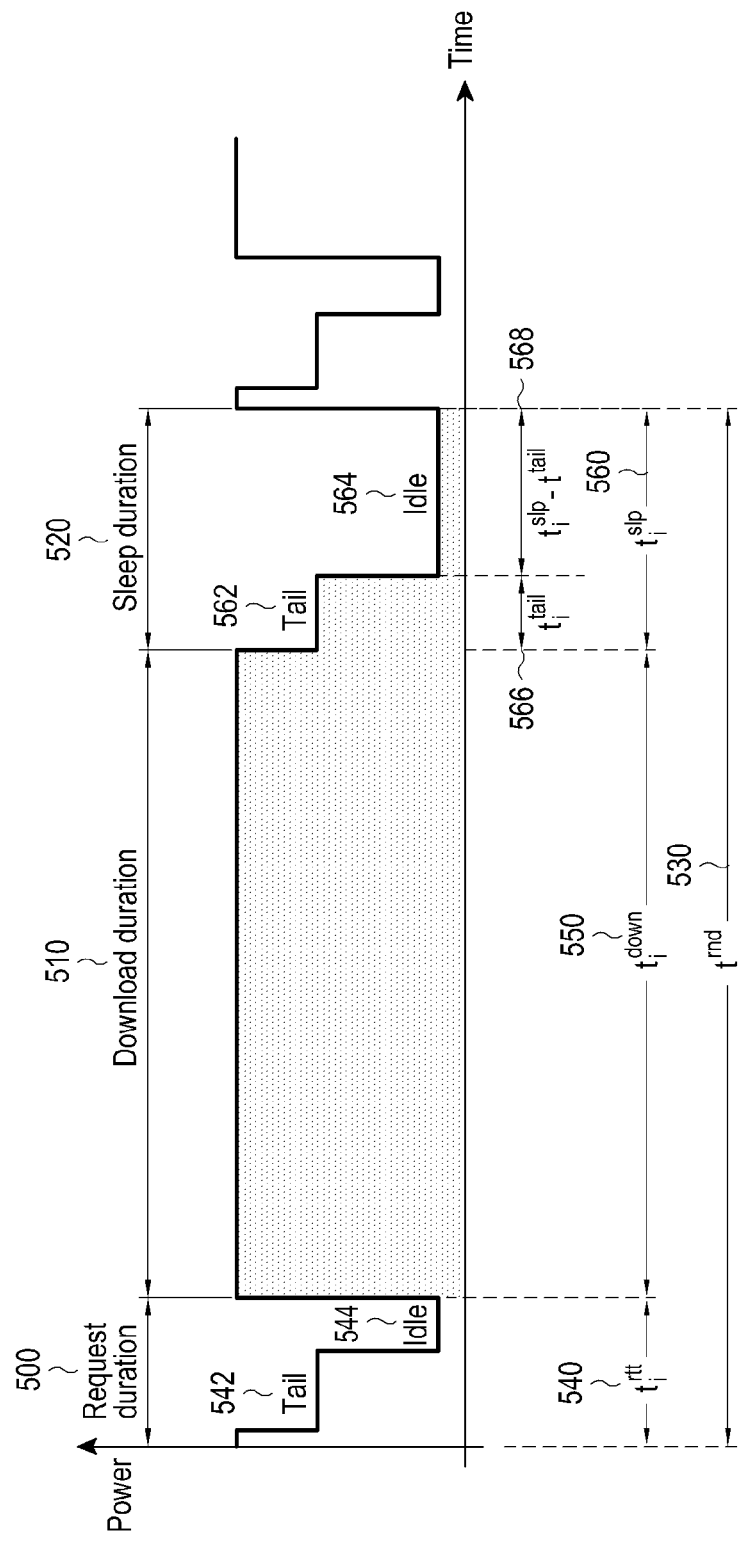
FIG. 5 illustrates an example of an energy consumption pattern at a terminal side according to the present disclosure.

FIG. 5 illustrates an example of an energy consumption pattern at the terminal side according to the present disclosure.

An operation of the terminal during a time $t^{rnd}$ 530 spent for one segment request round is described with reference to FIG. 5.

In a request duration 500, the terminal makes a request for a segment to the server. At this time, the terminal consumes power to transmit data for the segment request. When a round trip time $t_i^{rtt}$ 540 of the terminal to the server is long enough, the network enters a tail state 542 and an idle state 544 before reception of the requested segment is received.

When the terminal starts receiving the segment in earnest in a download duration 510, power for segment data reception is consumed for a download time $t_i^{rtt}$ 550.

When the data reception ends, the terminal stays in the tail and idle states for a time $t_i^{slp}$ in a sleep duration 520. At this time, $t_i^{tail}$ denotes a time for which the terminal stays in the tail state, which is differently set according to the wireless network I, and $t_i^{idle}$ denotes a time for which a wireless interface between the terminal and the wireless network I stays in the idle state. They may be calculated as follows.

$$t_i^{slp} = t^{rnd} - t_i^{rtt} - t_i^{down}(M) \tag{10}$$

$$t_i^{tail} = \begin{cases} T_i^{tail} & \text{if } t_i^{slp} \geq T_i^{tail}, \\ t_i^{slp} & \text{otherwise} \end{cases} \tag{11}$$

$$t_i^{idle} = \begin{cases} t_i^{slp} - t_i^{tail} & \text{if } t_i^{slp} > t_i^{tail}, \\ 0 & \text{otherwise} \end{cases} \tag{12}$$

In equation (11), $T_i^{tail}$ denotes a tail time uniquely set at every wireless network i. For example, $T_i^{tail}$ may have a value such as 200 msec in a case of Wi-Fi, and a value such as 10 sec in a case of LTE. When there is no data to be transmitted/received for the time $T_i^{tail}$ after the client terminal has completed the data download with the wireless network I, the time $t_i^{tail}$ for which the terminal actually stays in the tail state is same as the time $T_i^{tail}$. However, when data transmission/reception re-starts within the time $T_i^{tail}$ after the terminal has completed the data download, the $t_i^{tail}$ for which the terminal stays in the tail state becomes the time $t_i^{slp}$.

Energy consumed when the terminal makes a request for the segment to the server is very small compared to energy consumed when the segment data is received. Accordingly, in the present disclosure, only the part for the reception of the segment data is considered as the energy consumption of the terminal.

According to the present disclosure, it is assumed that the terminal has profiled power consumption information on each wireless network. At this time, the power consumption for each wireless network may be indicated by a data download power vector $\vec{p}^{down}$, a tail power vector $\vec{p}^{tail}$ of the sleep duration, and an idle power vector $\vec{p}^{idle}$ of the sleep duration, and may be expressed by the following equations.

$$\vec{p}^{down} = (p_1^{down}, p_2^{down}, \ldots, p_{N^{net}}^{down}) \tag{13}$$

$$\vec{p}^{tail} = (p_1^{tail}, p_2^{tail}, \ldots, p_{N^{net}}^{tail}) \tag{14}$$

$$\vec{p}^{idle} = (p_1^{idle}, p_2^{idle}, \ldots, p_{N^{net}}^{idle}) \tag{15}$$

In equation (13), download power $p_i^{down}$ of the $i^{th}$ wireless network may be modeled by the following linear equation.

$$p_i^{down} = \beta_i \cdot bw_i(t) + \gamma_i \tag{16}$$

In equation (16), $\beta_i$ and $\gamma_i$ denote modeling constants corresponding to the $i^{th}$ wireless network.

Through equation (16), average energy consumed per segment for the segment request round may be calculated as equation (17).

$$e(n^{seg}, M, t^{rnd}) = \frac{1}{n^{seg}} \sum_{i=1}^{N} \{p_i^{down} \cdot t_i^{down}(M) + p_i^{tail} \cdot t_i^{tail} + p_i^{idle} \cdot t_i^{idle}\} + \\ p^{base} \cdot (t_1^{down} + t_1^{slp}) \tag{17}$$

Subsequently, a method of calculating a distortion value for the segment request round to solve the parameter determination problem will be described.

The present disclosure uses an average distortion value of the video as a scale of video quality. In general, as a code rate is higher, distortion becomes smaller. According to the present disclosure, the client terminal may use the following two methods to know an average distortion value of the video.

In a first method, the streaming server provides the average distortion value of the video. The streaming server may transcode an original video for the HTTP adaptive streaming service and, at this time, calculate the average distortion value of the video. The streaming server may record the calculated average distortion value in an MPD file to inform the client terminal of the average distortion value. In a case of the DASH standard, the streaming server may provide a distortion value of the video by using an attribute value "@qualityRanking" of the MPD file. The attribute "@qualityRanking" corresponds to a selective attribute of a DASH representation element, and means higher video quality as a value thereof becomes smaller.

In a second method, when the streaming server cannot provide the average distortion value of the video, the client terminal predicts the distortion value of the video by using an estimation module implemented in the inside. At this time, the client terminal may predict the average distortion value of the video without the original video by using a scheme such as a no-reference video quality estimation model.

In order to acquire an optimal solution of the parameter determination problem, the client terminal according to the present disclosure may use a full-search based algorithm. In this case, the parameter determination algorithm according to the present disclosure may have complexity of $O(N^{qlt} \cdot N_{seg}^{max} \cdot \Pi_{i=1}^{N^{net}} m_i^{net})$. In the complexity, $N_{seg}^{max}$ denotes a maximum number of segments which can be requested by the terminal for one segment request round and may be preset as a predetermined value. At this time, $m_i^{max\_net}(n_{seg}^{new})$ denotes a maximum number of allowable packets of the network i.

The complexity is proportional to the number $N^{qlt}$ of video qualities which can be provided by the server and the number $N^{net}$ of wireless networks which can be used by the client terminal. However, in the actual HTTP adaptive streaming service, the size of $N^{qlt}$ is typically limited to be within 10, and the size of $N^{net}$ also typically has a limited value such as 2 to 3. If a mobile terminal can use only two networks, Wi-Fi and LTE, the complexity of the parameter determination algorithm according to the present disclosure is simplified as $$O\left(N^{qlt} \cdot N_{seg}^{max} \cdot \max_{1 \le i \le 2} \{m_i^{max\_net}(n_{seg}^{new})\}\right),$$

and the simplified complexity can be actually calculated by the client terminal.

Figure 6A:
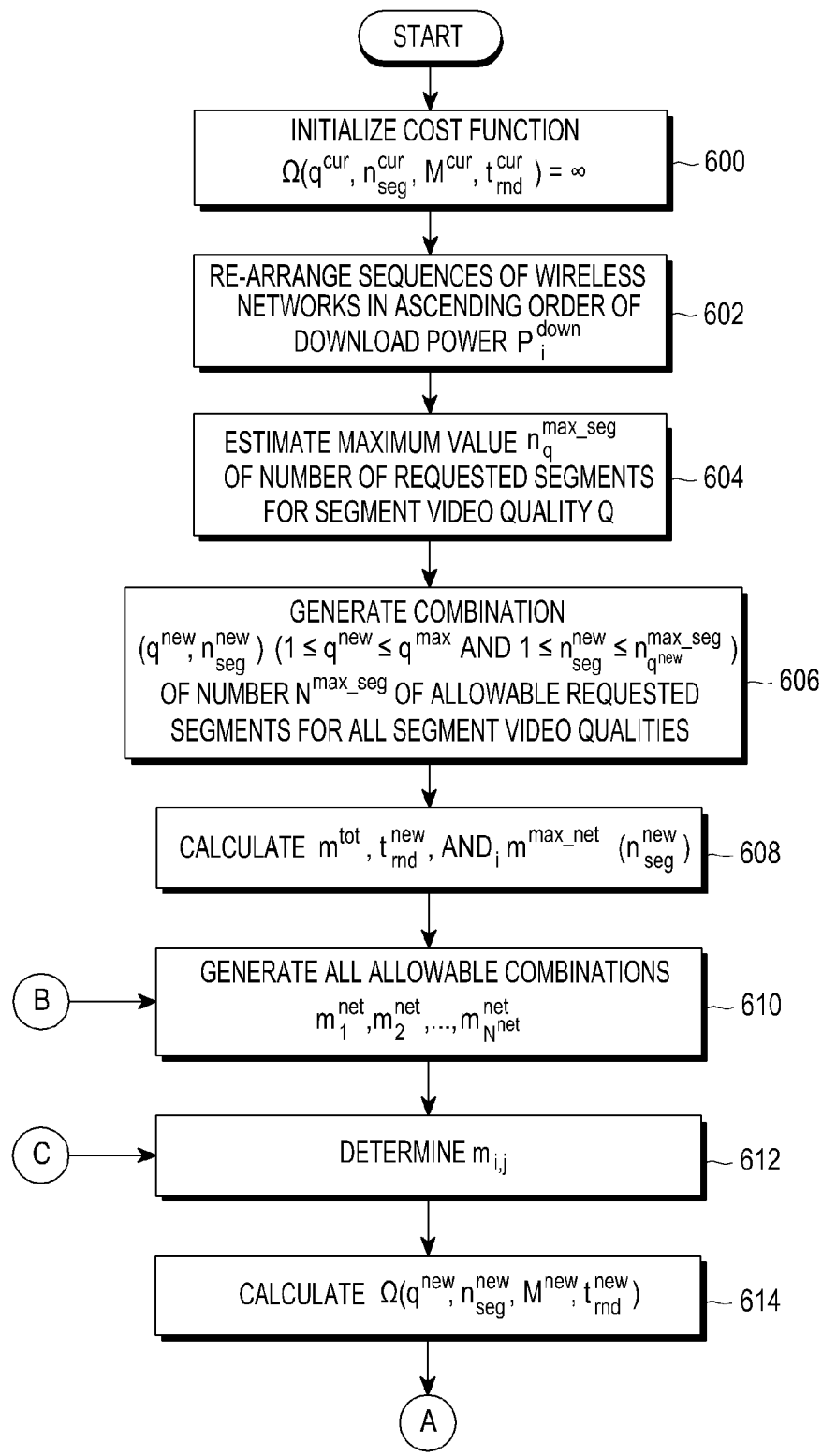
FIGS. 6A and 6B are flowcharts illustrating a method of determining a parameter by the client terminal according to the present disclosure.
Figure 6B:
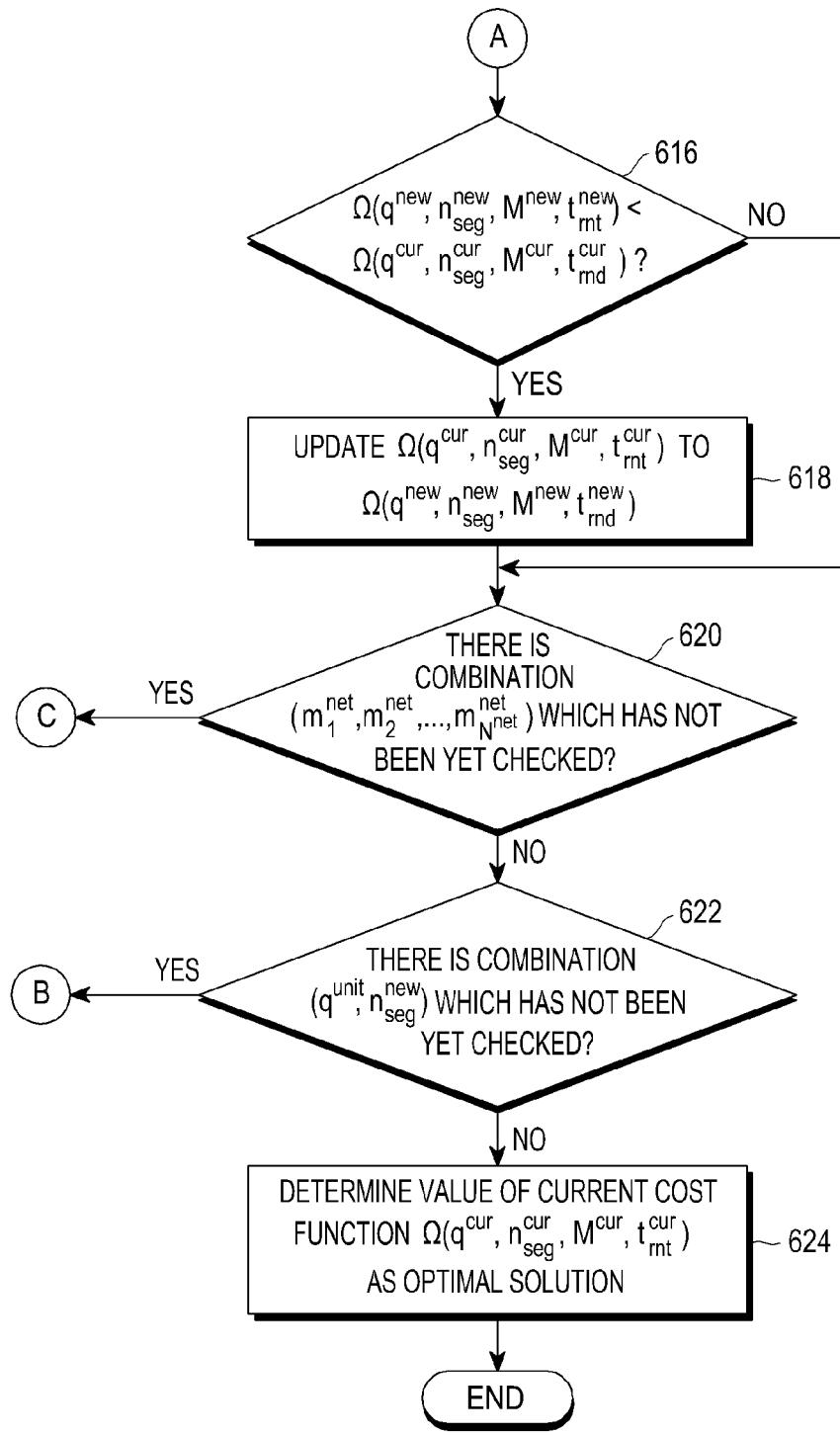

FIGS. 6A and 6B are flowcharts illustrating a method of determining a parameter by the client terminal according to the present disclosure. The terminal initializes various parameters and initializes a cost function as shown in equation (18) in step 600.

$$\Omega(q^{cur}, n_{seg}^{cur}, M^{cur}, t_{rnd}^{cur}) = \infty \quad (18)$$

The terminal re-arranges sequences of wireless networks in an ascending order of download power $p_i^{down}$ in step 602. The re-arranging operation 602 may be performed prior to the cost function initialization operation 600.

The terminal calculates a maximum value $n_q^{max\_seg}$ of the number of requested segments for the segment video quality q as shown in equations (19) and (20) in step 604.

$$t_q^{rnd}(n) = \quad (19)$$

$$\begin{cases} \chi \cdot (t^{buf} + T^{seg}) + (n-1) \cdot T^{seg} & \text{if } t_q^{rnd}(n) \ge \sum_{j=1}^{n} s_{j,q} \Big/ \sum_{i=1}^{N_{net}} bw_i, \\ & t_q^{rnd}(n) \le t^{buf} + n \cdot T^{seg} - T^{max}, \\ & \text{and } \sum_{j=1}^{n^{seg}} s_{j,q} \le S^{buf}, \\ 0 & \text{otherwise} \end{cases}$$

$$n_q^{max\_seg} = \arg \max_{1 \le n \le N^{max\_seg}} \{t_q^{rnd}(n)\} \quad (20)$$

In equation (19), $t^{buf}$ denotes a playable time of video data in an application buffer at a time point when the segment request round starts, $S^{buf}$ denotes a sum of the size of the TCP reception buffer and the size of the application buffer, and $T^{seg}$ denotes one segment play time.

In equation (20), $N^{max\_seg}$ denotes a maximum number of segments which can be requested for the segment request round.

The terminal generates a combination $(q^{new}, n_{seg}^{new})$ ($1 \le q^{new} \le q^{max}$ and $1 \le n_{seg}^{new} \le n_{q^{new}}^{max\_seg}$) of the number $N^{max\_seg}$ of allowable requested segments for all segment video qualities $N^{max\_seg}$ in step 606.

The terminal selects one combination from the generated combinations and calculates tot a total number $m^{tot}$ of packets to be received for the selected combination, a segment request round time $t_{rnd}^{new}$, and a maximum number of allowable packets according to each network $m_i^{max\_net}$ ($n_{seg}^{new}$) as shown in equations (21) and (23) in step 608.

$$m^{tot} = \sum_{j=1}^{n_{seg}^{new}} \left\lceil \frac{s_{j,q}^{new}}{P_{size}} \right\rceil \quad (21)$$

$$t_{rnd}^{new}(n_{seg}^{new}) = \chi \cdot (t^{buf} + T^{seg}) + (n_{seg}^{new} - 1) \cdot T^{seg} \quad (22)$$

$$m_i^{max\_net}(n_{seg}^{new}) = \left\lceil \frac{\{t_{rnd}^{new}(n_{seg}^{new}) - t_i^{rtt}\} \cdot bw_i}{P_{size}} \right\rceil \quad (23)$$

The terminal generates all allowable combinations ($m_1^{net}, m_2^{net}, \ldots, m_{N^{net}}^{net}$) which meet equation (24) to consider the number $m_i^{net}$ of packets received in each network in step 610.

$$m^{tot} = \sum_{i=1}^{N^{net}} m_i^{net} \text{ for } 0 \le m_i^{net} \le m_i^{max\_net}(n_{seg}^{new}) \quad (24)$$

The terminal may select one combination from the generated combinations ($m_1^{net}, m_2^{net}, \ldots, m_{N^{net}}^{net}$) and calculate a data amount (number of packets) $m_{i,j}$ of the $j^{th}$ segment requested from the $i^{th}$ network for the selected combination in step 612.

$$m_{i,j} = \begin{cases} \left\lceil \frac{s_{j,q}}{P_{size}} \times \frac{m_i^{net}}{m^{tot}} \right\rceil & \text{if } i < N^{net} \text{ and } j < n^{seg} \\ m_i^{net} - \sum_{k=1}^{j-1} m_{i,k} & \text{if } i < N^{net} \text{ and } j = n^{seg} \\ \left\lceil \frac{s_{j,q}}{P_{size}} \right\rceil - \sum_{k=1}^{i-1} m_{k,j} & \text{if } i = N^{net} \end{cases} \quad (25)$$

The terminal calculates a cost function $\Omega(q^{new}, n_{seg}^{new}, M^{new}, t_{rnd}^{new})$ by using the calculated $m_{i,j}$ in step 614.

In step 616, the terminal compares a value of the minimum cost function $\Omega(q^{cur}, n_{seg}^{cur}, M^{cur}, t_{rnt}^{cur})$ calculated up to now with a value of the new cost function $\Omega(q^{new}, n_{seg}^{new}, M^{new}, t_{rnd}^{new})$ calculated in step 614.

When the value of new cost function $\Omega(q^{cur}, n_{seg}^{cur}, M^{cur}, t_{rnt}^{cur})$ calculated in step 614 is smaller than the value of the current minimum cost function $\Omega(q^{new}, n_{seg}^{new}, M^{new}, t_{rnd}^{new})$, the terminal updates the value of the current minimum cost function $\Omega(q^{cur}, n_{seg}^{cur}, M^{cur}, t_{rnt}^{cur})$ to the value of the new cost function function $\Omega(q^{new}, n_{seg}^{new}, M^{new}, t_{rnd}^{new})$ in step 618.

The terminal inspects whether there is the combination ($m_1^{net}, m_2^{net}, \ldots, m_{N^{net}}^{net}$) which has not been yet checked in step 620. When there is the combination ($m_1^{net}, m_2^{net}, \ldots, m_{N^{net}}^{net}$) which has not been checked, the terminal may perform step 612 again and the following operations.

The terminal inspects whether there is the combination ($q_{new}, n_{seg}^{new}$) which has not been yet checked in step 622.

When there is the combination ($q_{new}, n_{seg}^{new}$) which has not been checked, the terminal may perform step 608 again and the following operations.

The terminal determines the value of the current cost function $\Omega(q^{cur}, n_{seg}^{cur}, M^{cur}, t_{rnt}^{cur})$ as the optimal solution as shown in equation (26) in step 624 after performing the above operations.

$$(q^{opt}, n_{seg}^{opt}, M^{cur}, t_{rnd}^{cur}) = (q_{cur}, n_{seg}^{cur}, M^{cur}, t_{rnd}^{cur}) \quad (26)$$

The client terminal according to the present disclosure may give a weighted value to a preferred element between consumed energy and video quality by using the energy-video quality weighted value $\lambda$. Parameters determined according to different energy-video quality weighted values have different tendencies.

As described above, the consumed energy and the video quality of the terminal have a close relation. For example, to support high video quality, much energy is consumed. Accordingly, in order to reduce energy consumption of the terminal, it is required to reduce video quality. Further, in order to increase video quality, it is required to increase energy consumption of the terminal.

For example, according to the present disclosure, the energy-video quality weighted value may be set by a "target battery consumption setting mode" user interface (UI).

Figure 7:
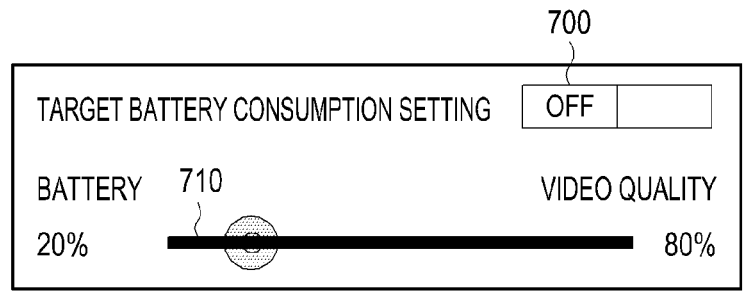
FIG. 7 illustrates an example of a user interface (UI) for setting target battery consumption provided by the terminal according to the present disclosure.

FIG. 7 illustrates an example of a UI for setting target battery consumption provided by the terminal according to the present disclosure. A case where the target battery consumption setting mode is deactivated will be described with reference to FIG. 7. The case where the target battery consumption setting mode is deactivated corresponds to a case where a fixed energy-video quality weighted value is used.

When the user deactivates the "target battery consumption setting" mode by selecting the "target battery consumption setting" as "off" 700, the energy-video quality weighted value $\lambda$ may be set by a user's preference. As illustrated in FIG. 7, the user may determine the energy-video quality weighted value as a value from 0 to 100 by selecting a predetermined position on a level selection bar 710. As the value selected by the user is closer to "video quality" (that is, video quality 100%), the energy-video quality weighted value $\lambda$ becomes closer to 0 and thus weighs the video quality more heavily. In contrast, as the value selected by the user is closer to the "battery" (that is, video quality 0%), the energy-video quality weighted value $\lambda$ becomes closer to 1 and thus weighs consumed energy more heavily than the video quality, thereby further reducing battery consumption of the client terminal.

Figure 8:
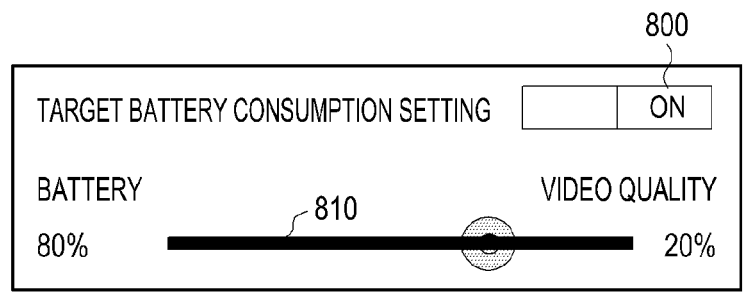
FIG. 8 illustrates an example of another user interface (UI) for setting target battery consumption provided by the terminal according to the present disclosure.

FIG. 8 illustrates an example of another user interface (UI) for setting target battery consumption provided by the terminal according to the present disclosure. A case where the target battery consumption setting mode is activated will be described with reference to FIG. 8. The case where the target battery consumption setting mode is activated corresponds to a case where an adaptive energy-video quality weighted value is used.

When the user activates the "target battery consumption setting" mode by selecting the "target battery consumption setting" as "on" 800, the energy-video quality weighted value may be adaptively determined to be close to the target battery consumption set by the user. That is, when the "target battery consumption setting" is selected as "on" 800, a level selection bar 810 to receive the energy-video quality weighted value may be deactivated and the terminal may output a separate UI for receiving the target battery consumption.

Figure 9:
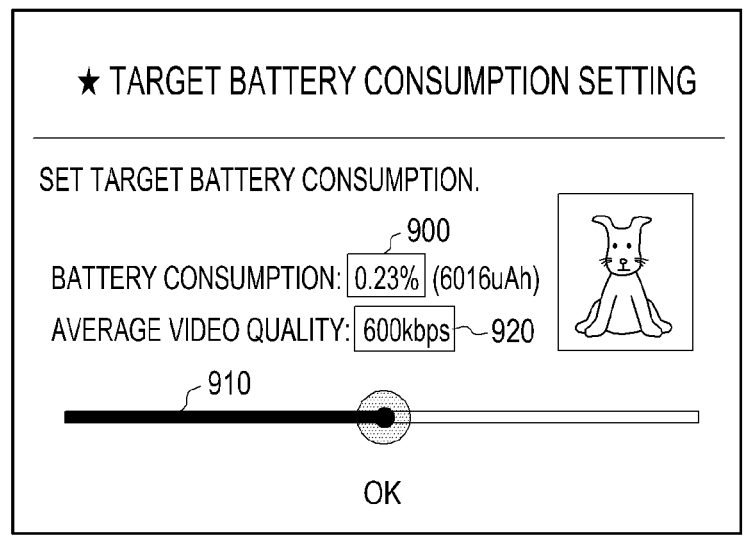
FIG. 9 illustrates a screen example for receiving target battery consumption provided by the terminal according to the present disclosure.

FIG. 9 illustrates a screen example for receiving target battery consumption provided by the terminal according to the present disclosure. The user may select the target battery consumption by selecting a predetermined position on a state selection bar 910. According to a user's input on the state selection bar 910, the terminal may output corresponding target battery consumption 900 and corresponding average video quality 920 on the screen as numerical values.

The terminal having received the target battery consumption adaptively controls video quality not to exceed the target battery consumption until video play ends.

Meanwhile, when the terminal exceeds expected battery consumption by a particular reason such as a bad network state, the terminal may output an additional user interface (UI) (for example, as illustrated in FIG. 9) to receive a re-input of the target battery consumption from the user in a popup form.

Figure 10:
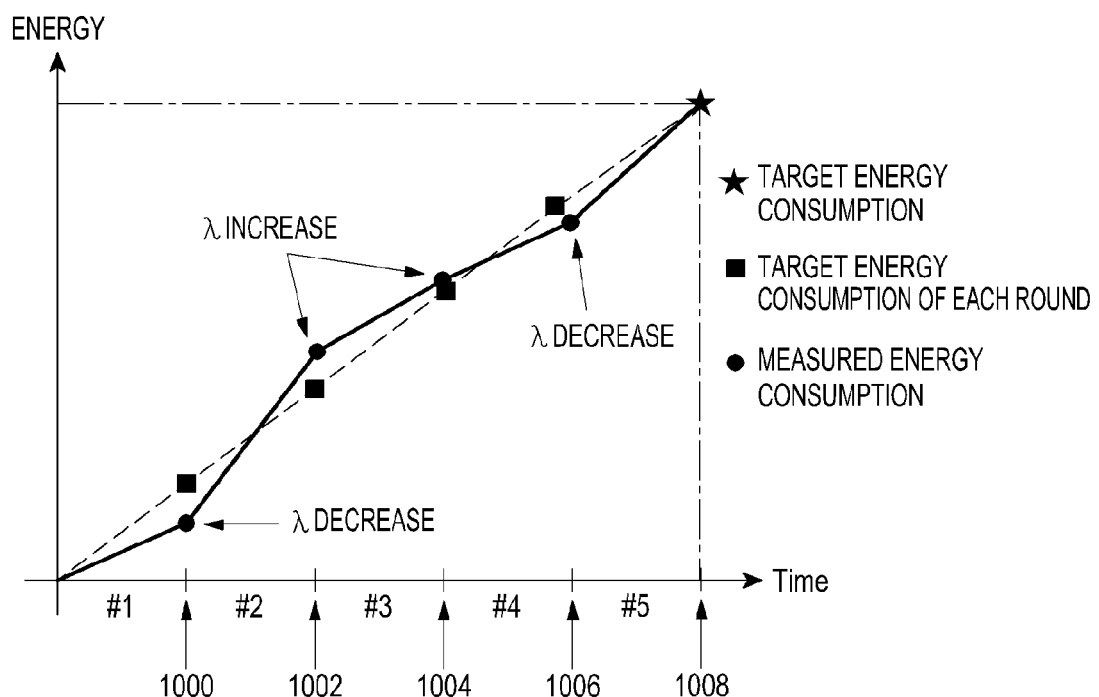
FIG. 10 is a graph showing an adaptive operation result of an energy-video quality weighted value in a target battery consumption setting mode of the terminal according to the present disclosure.

FIG. 10 is a graph showing an adaptive operation result of the energy-video quality weighted value in the target battery consumption setting mode of the terminal according to the present disclosure.

The terminal which determines that energy consumption measured at a time point 1000 when segment request round #1 ends is smaller than target energy consumption reduces the energy-video quality weighted value $\lambda$ to request and play a high video quality segment.

The terminal which determines that energy consumption measured at a time point 1002 when segment request round #2 ends is larger than the target energy consumption increases the energy-video quality weighted value $\lambda$ to request and play a low video quality segment.

The terminal which determines that energy consumption measured at a time point 1004 when segment request round #3 ends is still larger than the target energy consumption increases the energy-video quality weighted value $\lambda$ to request and play a low video quality segment.

The terminal which determines that energy consumption measured at a time point 1006 when segment request round #4 ends is smaller than the target energy consumption reduces the energy-video quality weighted value $\lambda$ to request and play a high video quality segment.

Through such an operation, the terminal may allow energy consumption measured at a time point 1008 when segment request round #5 ends to come close to the target energy consumption.

Figure 11:
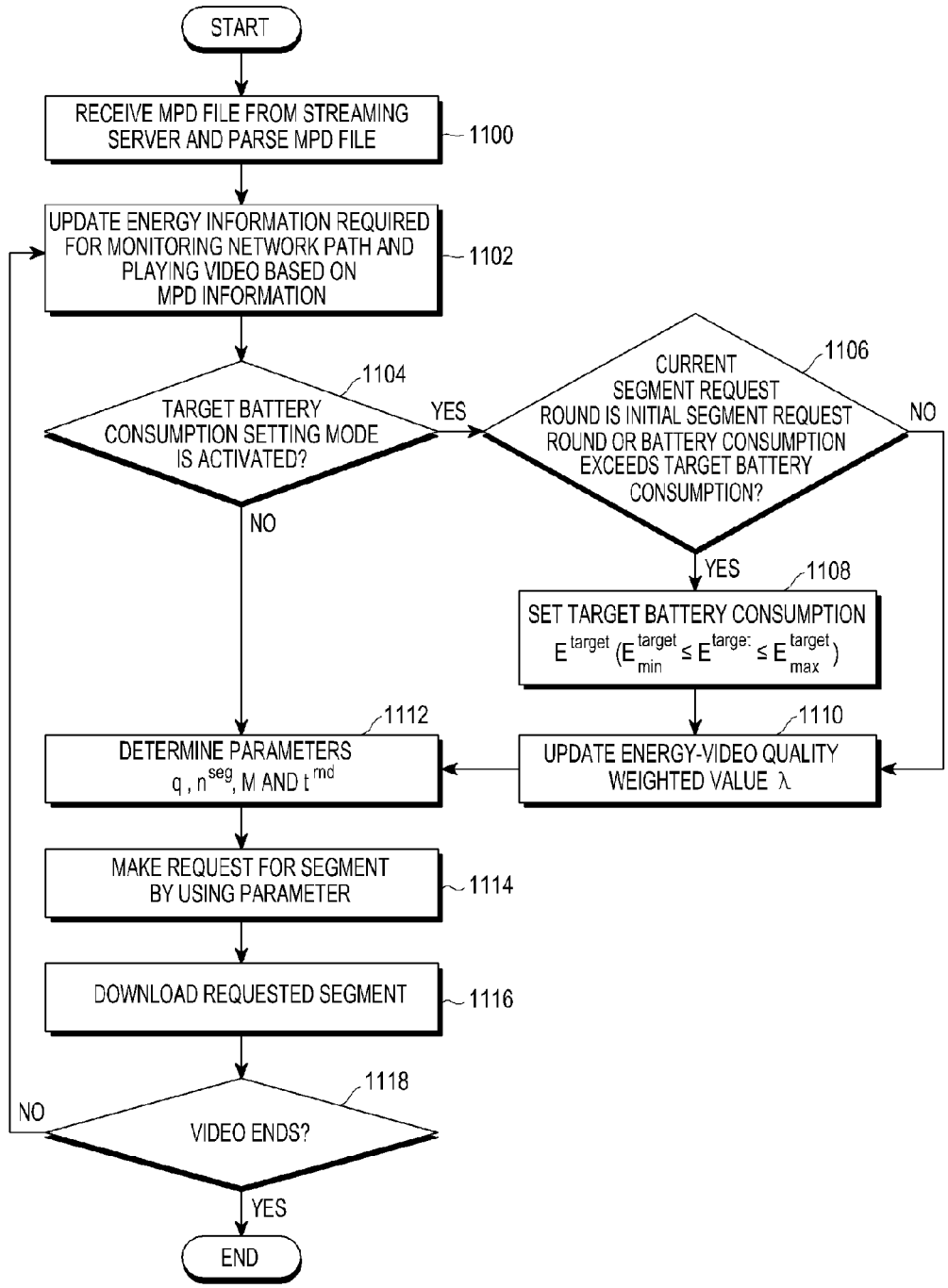
FIG. 11 is a flowchart illustrating a method of operating the target battery consumption setting mode by using the parameter determination method by the terminal according to the present disclosure.

FIG. 11 is a flowchart illustrating a method of operating the target battery consumption setting mode by using the parameter determination method by the terminal according to the present disclosure.

A method of adaptively changing the energy-video quality weighted value when the target battery consumption setting mode is activated will be described with reference to FIG. 11.

The client terminal receives an MPD file from the streaming server before playing a video and parses the MPD file to acquire MPD information in step 1100.

The terminal updates energy information required for monitoring a network path and playing the video based on the acquired MPD information in step 1102. The energy information may include minimum energy consumption $E_{min}^{target}$ and maximum energy consumption $E_{max}^{target}$.

The terminal may determine whether the target battery consumption setting mode is activated in step 1104. When the target battery consumption setting mode is activated, the terminal may check whether a current segment request round is an initial segment request round or battery consumption exceeds target battery consumption in step 1106.

When the current segment request round is the initial round or when the battery consumption exceeds the target battery consumption, the terminal may provide the level selection bar 910 having values between the maximum/minimum energy consumption $E_{min}^{target}$ and $E_{max}^{target}$ for video play as illustrated in FIG. 9 and receive one of the values between $E_{min}^{target}$ and $E_{max}^{target}$ as the target battery consumption $E^{target}$ from the user in step 1108.

$E_{min}^{target}$ and $E_{max}^{target}$ may be calculated based on equations below.

$$E_{min}^{target} = E_{min}^{seg} \cdot N_{tot}^{seg} \quad (27)$$

$$E_{max}^{target} = E_{max}^{seg} \cdot N_{tot}^{seg} \quad (28)$$

In equations (27) and (28), $E_{min}^{seg}$ and $E_{max}^{seg}$ denote minimum energy and maximum energy which may be consumed by one segment, respectively, and $N_{tot}^{seg}$ denotes a total number of segments required for a total video play time.

At this time, $E_{min}^{seg}$ and $E_{max}^{seg}$ may be calculated based on equations below.

$$E_{min}^{seg} = (p^{base} + p_1^{down}) \cdot T^{seg} \quad (29)$$

$$E_{max}^{seg} = (p^{base} + \Sigma_{i=1}^{N^{net}} p_i^{down}) \cdot T^{seg} \quad (30)$$

In equation (29), $E_{min}^{seg}$ denotes energy when data is received from $T^{seg}$ by using only a network which consumes smallest power.

In equation (30), $E_{max}^{seg}$ denotes energy when data is received for $T^{seg}$ by using all networks.

$E^{target}$ selected by the user has a relation as shown in equation (31).

$$E^{target} = E^{seg} \cdot N_{tot}^{seg} \quad (31)$$

The terminal updates the energy-video quality weighted value λ by using $E_{target}$ in step 1110.

More specifically, the terminal may control the energy-video quality weighted value λ to make actual battery consumption come closer to the target battery consumption as illustrated in FIG. 10 until the video play ends. At this time, a real-time energy-video quality weighted value control algorithm used by the terminal may be expressed by, for example, equations below.

$$\lambda_{k+1} = \lambda_k + \Delta\lambda_k \quad (32)$$

$$\Delta\lambda_k = \frac{E_k}{E_k^{target}} - 1 \quad (33)$$

$$E_k^{target} = E^{seg} \cdot n^{seg} + E_{k-1}^{target} - E_{k-1} \quad (34)$$

In the above equations, $\lambda_k$ denotes an energy-video quality weighted value for a $k_{th}$ segment request round. $E_k$ denotes actual battery consumption measured for the $k_{th}$ segment request round and $E_k^{target}$ denotes target energy consumption of the $k_{th}$ segment request round.

The terminal determines parameters q, $n^{seg}$, M, and $t^{rnd}$ which minimize a cost function by using the updated weighted value λ in step 1112.

The terminal makes a request for a segment by using the determined parameters in step 1114. The terminal may download the requested segment in step 1116, and play the downloaded segment. Additionally, the terminal may check whether the video ends based on the current segment in step 1118, and end an adaptive streaming operation according to a result of the check.

It is noted that the view illustrating the configuration of the terminal apparatus, the view illustrating the segment request round, the parameter determination method of the terminal, and the UI provided by the terminal, illustrated in FIGS. 2 through 11 do not have an intention to limit the claim of the present disclosure. That is, all components, steps of all operations, and all UI elements illustrated in FIGS. 2 through 11 should not be construed as necessary components for implementing the present disclosure, and the present disclosure can be implemented only by some of the components without departing from the scope of the present disclosure.

The above described operations may be implemented by providing a memory device storing a corresponding program code to any constituent unit in a smart module or a device. That is, the controller of the smart module or device may perform the above described operations by reading and executing the program code stored in the memory device by means of a processor or a central processing unit (CPU).

The various components of the smart module, device and the like used in the specification may operate by using a hardware circuit, for example, a combination of a complementary metal oxide semiconductor based logical circuit, firmware, software and/or hardware, and a combination of firmware and/or software inserted into a machine-readable medium. As an example, various electric configurations and methods may be carried out by using electric circuits such as transistors, logic gates, and an application specific integrated circuit (ASIC).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method of receiving a video segment by a client device using hypertext transfer protocol (HTTP) adaptive streaming, the method comprising:
   receiving media presentation description (MPD) information from a streaming server;
   identifying a plurality of available bandwidths corresponding respectively to a plurality of networks and a power consumption value which is set for receiving a video segment;
   resetting a target power consumption value based on the identified power consumption value;
   obtaining a plurality of second parameter sets for a first segment request round;
   selecting a first parameter set from among the plurality of second parameter sets, based on the MPD information, the plurality of available bandwidths, and the reset target power consumption value, wherein the first parameter set includes information on a number of video segments, a plurality of parts of the video segment to be requested respectively through the plurality of networks and a video quality level during the first segment request round, wherein the video segment is one of the video segments;
   requesting the plurality of parts of the video segment to the streaming server respectively through the plurality of networks during the first segment request round based on the first parameter set;

receiving the plurality of parts of the video segment from the streaming server respectively through the plurality of networks; and generating the video segment by combining the plurality of parts of the video segment, wherein the first parameter set is selected to minimize a predetermined function wherein the predetermined function depends on energy consumption value required to recevice the plurality of parts of the video segment and the video quality level during the first segment request round.

2. The method of claim 1, wherein the predetermined function is represented by a sum of the energy consumption value based on the plurality of parts of the video segments to be requested respectively through the plurality of networks and a video quality value based on the video quality level, and wherein a first weighted value is applied to the energy consumption value and a second weighted value is applied to the video quality value, and the first weighted value is determined based on the reset target power consumption value, and a sum of the first weighted value and the second weight value is a predetermined value.

3. The method of claim 1, wherein the first parameter set further includes a length of the first segment request round.

4. The method of claim 2, wherein the energy consumption value is determined using the plurality of parts of the video segment and the reset target power consumption value.

5. The method of claim 2, wherein the video quality level is represented as an average video distortion value of the video segment.

6. The method of claim 1, wherein video quality levels for the video segments to be requested through the plurality of networks are equal to each other.

7. The method of claim 2, wherein the first weighted value is decreased by a first preset value if the identified power consumption value is smaller than the reset target power consumption value; and the first weighted value is increased by a second preset value if the identified power consumption value is larger than the reset target power consumption value, the first preset value and the second preset value being determined using the identified power consumption value and the reset target power consumption value.

8. The method of claim 5, wherein the video quality value is determined using the average video distortion value of the video segment and an average video distortion value of available video segments from the streaming server.

9. The method of claim 1, wherein the target power consumption value includes a power consumption value between a maximum power consumption value and a minimum power consumption value calculated based on the MPD information.

10. The method of claim 1, wherein the plurality of networks include two or more heterogeneous wireless networks.

11. A client device for receiving a video segment by using hypertext transfer protocol (HTTP) adaptive streaming, the client device comprising:
 a transceiver; and
 at least one processor coupled to the transceiver; and
 wherein the at least one processor is configured to:
  receive media presentation description (MPD) information from a streaming server,
  identify a plurality of available bandwidths corresponding respectively to a plurality of networks and a power consumption value which is set for receiving a video segment,
  reset a target power consumption value based on the identified power consumption value,
  obtain a plurality of second parameter sets for a first segment request round,
  select a first parameter set from the plurality of second parameter sets, based on the MPD information, the plurality of available bandwidths, and the reset target power consumption value, wherein the first parameter set includes information on a number of video segments, a plurality of parts of the video segment to be requested respectively through the plurality of networks and a video quality level during the first segment request round,
  request the plurality of parts of the video segment to the streaming server respectively through the plurality of networks during the first segment request round based on the first parameter set, and
  receive the plurality of parts of the video segment from the streaming server respectively through the plurality of networks; and
  generate a video by combining the plurality of parts of the video segment,
 wherein the first parameter set is selected to minimize predetermined function wherein the predetermined function depends on energy consumption value required to receive the plurality of parts of the video segment and the video quality level during the first segment request round.

12. The client device of claim 11, wherein the predetermined function is represented by a sum of the energy consumption value based on the plurality of parts of the video segments to be requested respectively through the plurality of networks and a video quality value based on the video quality level, and wherein a first weighted value is applied to the energy consumption value and a second weighted value is applied to the video quality value, the first weighted value is determined based on the reset target power consumption value, and a sum of the first weighted value and the second weight value is a predetermined value.

13. The client device of claim 11, wherein the first parameter set further includes a length of the first segment request round.

14. The client device of claim 12, wherein the energy consumption value is determined using the plurality of parts of the video segments and the reset target power consumption value.

15. The client device of claim 12, wherein the video quality level is represented as an average video distortion value of the video segment.

16. The client device of claim 11, wherein video quality levels for the video segments to be requested through the plurality of networks are equal to each other.

17. The client device of claim 12, wherein the first weighted value is decreased by a first preset value if the identified power consumption value is smaller than the reset target power consumption value; and first weighted value is increased by a second preset value if the identified power consumption value is larger than the reset target power consumption value, the first preset value and the second preset value being determined using the identified power consumption value and the reset target power consumption value.

18. The client device of claim 15, wherein the video quality value is determined using the average video distortion value of the video segment and an average video distortion value of available video segments from the streaming server.

19. The client device of claim 11, wherein the target power consumption value includes a power consumption value between a maximum power consumption value and a minimum power consumption value, calculated based on the MPD information.

20. The client device of claim 11, wherein the plurality of networks include two or more heterogeneous wireless networks, respectively.

* * * * *